(12) United States Patent
Ramos et al.

(10) Patent No.: US 12,008,043 B2
(45) Date of Patent: Jun. 11, 2024

(54) NATURAL LANGUAGE QUERY PROCESSING AND DEBUGGING

(71) Applicant: Microsoft Technology Licensing, LLC, Redmond, WA (US)

(72) Inventors: Gonzalo A. Ramos, Kirkland, WA (US); Adam Fourney, Bothell, WA (US); Bongshin Lee, Issaquah, WA (US); Arpit Ajay Narechania, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 17/215,217

(22) Filed: Mar. 29, 2021

(65) Prior Publication Data

US 2022/0309106 A1     Sep. 29, 2022

(51) Int. Cl.
*G06F 16/00*     (2019.01)
*G06F 16/9032*   (2019.01)
*G06N 20/00*     (2019.01)

(52) U.S. Cl.
CPC ....... *G06F 16/90332* (2019.01); *G06N 20/00* (2019.01)

(58) Field of Classification Search
CPC ........................... G06F 16/90332; G06N 20/00
See application file for complete search history.

(56) References Cited

U.S. PATENT DOCUMENTS

| | | | |
|---|---|---|---|
| 7,500,225 B2 | 3/2009 | Khan et al. | |
| 7,694,278 B2* | 4/2010 | Pasumansky | ....... G06F 11/3636 717/125 |
| 7,707,555 B2* | 4/2010 | Spertus | ............... G06F 11/3664 717/124 |
| 9,823,995 B2 | 11/2017 | Menahem et al. | |
| 10,303,683 B2 | 5/2019 | Anderson et al. | |
| 10,592,505 B2* | 3/2020 | Galitsky | ........... G06F 16/24522 |
| 10,885,119 B2* | 1/2021 | Ramachandra Iyer | ...................... G06F 16/904 |

(Continued)

FOREIGN PATENT DOCUMENTS

CN      111782764 A      10/2020

OTHER PUBLICATIONS

"Microsoft Teams", Retrieved from: https://web.archive.org/web/20210131004032/https://www.microsoft.com/en-us/microsoft-teams/group-chat-software, Jan. 31, 2020, 6 Pages.

(Continued)

*Primary Examiner* — Noosha Arjomandi

(57) ABSTRACT

In example, a natural language input is processed to generate a formal query that is executed to retrieve data from a data store. An indication as to which subparts of the natural language input were used to generate the formal query may be presented to a user. The user may debug the query, such that associations between natural language input subparts and formal query subparts may be changed, added, or removed by the user. Further, a set of steps may be generated that provide an indication to the user as to how the formal query is executed, for example using sample data from the data store. The user may manipulate the sample data, thereby causing the presented steps to be updated accordingly. Once the user has made adjustments and has finished debugging the query, the revised formal query may be executed to retrieve updated data from the data store.

20 Claims, 13 Drawing Sheets

(56) References Cited

U.S. PATENT DOCUMENTS

| | | | | |
|---|---|---|---|---|
| 11,238,102 | B1* | 2/2022 | Lisuk | G06F 40/205 |
| 11,777,755 | B2* | 10/2023 | Fahrendorff | H04L 67/306 |
| | | | | 709/204 |
| 2009/0089756 | A1* | 4/2009 | Danton | G06F 11/3644 |
| | | | | 717/124 |
| 2011/0191364 | A1* | 8/2011 | LeBeau | G06F 16/3338 |
| | | | | 707/E17.014 |
| 2012/0109878 | A1* | 5/2012 | Debrot | G06F 16/283 |
| | | | | 707/602 |
| 2012/0124557 | A1* | 5/2012 | Khandelwal | G06F 11/3664 |
| | | | | 717/125 |
| 2014/0143600 | A1* | 5/2014 | Hutner | G06F 11/2294 |
| | | | | 714/E11.021 |
| 2014/0201229 | A1* | 7/2014 | Kirazci | G06F 16/3323 |
| | | | | 707/767 |
| 2014/0331215 | A1* | 11/2014 | Bowler | G06F 8/4434 |
| | | | | 717/151 |
| 2016/0147637 | A1* | 5/2016 | Bhagavan | G06F 16/245 |
| | | | | 717/127 |
| 2017/0083569 | A1* | 3/2017 | Boguraev | G06F 40/205 |
| 2018/0196822 | A1* | 7/2018 | Lewin-Eytan | G06F 16/3322 |
| 2018/0225331 | A1* | 8/2018 | Agrawal | G06F 16/24549 |
| 2020/0327168 | A1* | 10/2020 | Jiang | G06F 40/53 |
| 2020/0334233 | A1 | 10/2020 | Lee et al. | |
| 2021/0295822 | A1* | 9/2021 | Tomkins | G06F 16/3329 |
| 2022/0309106 | A1* | 9/2022 | Ramos | G06F 16/90332 |
| 2023/0120131 | A1* | 4/2023 | Kanungo | G06N 3/09 |
| | | | | 706/11 |

OTHER PUBLICATIONS

"React", Retrieved from: https://web.archive.org/web/20210129021548/https:/reactjs.org/, Jan. 29, 2021, 2 Pages.

"SQL", Retrieved from: https://web.archive.org/web/20210201080234/https:/www.w3schools.com/sql/trysql.asp?filename=trysql_select_all, Feb. 1, 2021, 1 Page.

"SQL Fiddle", Retrieved from: https://web.archive.org/web/20210129104725/http:/sqlfiddle.com/, Jan. 29, 2021, 1 Page.

"SQL.js", Retrieved from: https://web.archive.org/web/20201102223309/https:/sql.js.org/#/, Nov. 2, 2020, 7 Pages.

Abouzied, et al., "DataPlay: Interactive Tweaking and Example-driven Correction of Graphical Database Queries", in Proceedings of the 25th Annual ACM Symposium on user Interface Software and Technology, Oct. 7, 2012, pp. 207-217.

Berant, et al., "Explaining Queries over Web Tables to Non-Experts", in Proceedings of the 35th International Conference on Data Engineering, Apr. 8, 2019, pp. 1570-1573.

Bergamaschi, et al., "QUEST: A Keyword Search System for Relational Data Based on Semantic and Machine Learning Techniques", in Proceedings of the VLDB Endowment, vol. 6, Issue 12, Aug. 26, 2013, pp. 1222-1225.

Blunschi, et al., "SODA: Generating SQL for Business Users", in Proceedings of the VLDB Endowment, vol. 5, Issue 10, Aug. 27, 2012, pp. 932-943.

Bobrow, et al., "GUS, A Frame-Driven Dialog System", in Journal of Artificial Intelligence, vol. 8, Issue 2, Apr. 1, 1977, pp. 155-173.

Bogin, et al., "Global Reasoning over Database Structures for Text-to-SQL Parsing", in Repository of arXiv:1908.11214v1, Aug. 29, 2019, 8 Pages.

Bogin, et al., "Representing Schema Structure with Graph Neural Networks for Text-to-SQL Parsing", in Repository of arXiv:1905.06241v1, May 15, 2019, 7 Pages.

Brooke, John, "SUS: A Retrospective", in Journal of the Usability Studies, vol. 8, Issue 2, Feb. 2013, pp. 29-40.

Chaudhuri, et al., "Estimating Progress of Execution for SQL Queries", in Proceedings of the ACM SIGMOD International Conference on Management of Data, Jun. 13, 2004, pp. 803-814.

Choi, et al., "RYANSQL: Recursively Applying Sketch-based Slot Fillings for Complex Text-to-SQL in Cross-Domain Databases", in Repository of arXiv:2004.03125v1, Apr. 7, 2020, 10 Pages.

Chung, et al., "A Practical QA System in Restricted Domains", in Proceedings of the Conference on Question Answering in Restricted Domains, Jul. 2004, 7 Pages.

Clark, et al., "A Knowledge-Based Approach to Question-Answering", in Proceedings of AAAI, vol. 99, Mar. 1999, pp. 43-51.

Danaparamita, et al., "QueryViz: Helping users Understand SQL Queries and their Patterns", in Proceedings of the 14th International Conference on Extending Database Technology, Mar. 22, 2011, pp. 558-561.

Elgohary, et al., "Speak to your Parser: Interactive Text-to-SQL with Natural Language Feedback", in Repository of arXiv:2005.02539v1, May 5, 2020, 14 Pages.

Gao, et al., "DataTone: Managing Ambiguity in Natural Language Interfaces for Data Visualization", Iin Proceedings of the 28th Annual ACM Symposium on user Interface Software and Technology, Nov. 8, 2015, pp. 489-500.

Green, et al., "Baseball: An Automatic Question-Answerer", in Proceedings of the Western Joint IRE-AIEE-ACM Computer Conference, May 9, 1961, pp. 219-224.

Yu, et al., "Spider: A Large-Scale Human-Labeled Dataset for Complex and Cross-Domain Semantic Parsing and Text-to-SQL Task", in Repository of arXiv:1809.08887v1, Sep. 24, 2018, 11 Pages.

Guo, et al., "Towards Complex Text-to-SQL in Cross-Domain Database with Intermediate Representation", in Repository of arXiv:1905.08205v1, May 20, 2019, 16 Pages.

He, et al., "X-SQL: Reinforce Schema Representation with Context", in Repository of arXiv:1908.08113v1, Aug. 21, 2019, 5 Pages.

Herzig, et al., "TAPAS: Weakly Supervised Table Parsing via Pre-training", in Repository of arXiv:2004.02349v1, Apr. 5, 2020, 14 Pages.

Hoque, et al., "Applying Pragmatics Principles for Interaction with Visual Analytics", in Journal of IEEE Transactions on Visualization and Computer Graphics, vol. 24, Issue 1, Jan. 2018, pp. 309-318.

Ibrahim, et al., "Class Diagram Extraction from Textual Requirements using Natural Language Processing (NLP) Techniques", in Proceedings of the Second International Conference on Computer Research and Development, May 7, 2010, pp. 200-204.

Kassel, et al., "Valletto: A Multi-Modal Interface for Ubiquitous Visual Analytics", in Proceedings of Extended Abstracts of the Conference on Human Factors in Computing Systems, Apr. 21, 2018, pp. 1-6.

Katz, Boris, "Annotating the World Wide Web using Natural Language", in Proceedings of the 5th RIAO Conference on Computer Assisted Information Searching on the Internet, Jun. 25, 1997, 7 Pages.

Kaufmann, et al., "NLP-Reduce: A "naïve" but Domainindependent Natural Language Interface for Querying Ontologies", in Proceedings of the 4th European Semantic Web Conference, Jun. 2007, 2 Pages.

Kelkar, et al., "Bertrand-DR: Improving Text-to-SQL using a Discriminative Re-Ranker", in Repository of arXiv:2002.00557v1, Feb. 3, 2020, 7 Pages.

Kim, et al., "Answering Questions about Charts and Generating Visual Explanations", in Proceedings of the CHI Conference on Human Factors in Computing Systems, Apr. 25, 2020, 13 Pages.

Kokkalis, et al., "Logos: A System for Translating Queries into Narratives", in Proceedings of the ACM SIGMOD International Conference on Management of Data, May 20, 2012, pp. 673-676.

Koutrika, et al., "Explaining Structured Queries in Natural Language", in Proceedings of 26th International Conference on Data Engineering, Mar. 1, 2010, 12 Pages.

Lee, Dongjun, "Clause-Wise and Recursive Decoding for Complex and Cross-Domain Text-to-SQL Generation", in Repository of arXiv:1904.08835v2, Aug. 19, 2019, 7 Pages.

Leventidis, et al., "QueryVis: Logic-based Diagrams Help users Understand Complicated SQL Queries Faster", in Proceedings of the ACM SIGMOD International Conference on Management of Data, Jun. 14, 2020, pp. 2303-2318.

(56) References Cited

OTHER PUBLICATIONS

Li, et al., "NaLIR: An Interactive Natural Language Interface for Querying Relational Databases", Iin Proceedings of the ACM SIGMOD International Conference on Management of Data, Jun. 2014, pp. 709-712.
Lin, et al., "Grammar-based Neural Text-to-SQL Generation", in Repository of arXiv:1905.13326v1, May 30, 2019, pp. 1-10.
Mishra, et al., "Context-Aware Restricted Geographical Domain Question Answering System", In Proceedings of International Conference on Computational Intelligence and Communication Networks, Nov. 26, 2010, pp. 548-553.
Narechania, et al., "NL4DV: A Toolkit for Generating Analytic Specifications for Data Visualization from Natural Language Queries", In Journal of the IEEE Transactions on Visualization and Computer Graphics, vol. 27, Issue 2, Feb. 2021, pp. 369-379.
Pasupat, et al., "Compositional Semantic Parsing on Semi-Structured Tables", In Proceedings of the 53rd Annual Meeting of the Association for Computational Linguistics and the 7th International Joint Conference on Natural Language Processing (vol. 1: Long Papers), Jul. 26, 2015, pp. 1470-1480.
Popescu, et al., "Towards a Theory of Natural Language Interfaces to Databases", in Proceedings of the 8th International conference on Intelligent user interfaces, Jan. 2003, pp. 149-157.
Setlur, et al., "Eviza: A Natural Language Interface for Visual Analysis", in Proceedings of the 29th Annual Symposium on User Interface Software and Technology, Oct. 2016, pp. 365-377.
Setlur, et al., "Inferencing Underspecified Natural Language Utterances in Visual Analysis", in Proceedings of the 24th International Conference on Intelligent User Interfaces, Mar. 2019, pp. 40-51.
Simitsis, et al., "DBMSs should talk back too", in Repository of arXiv:0909.1786, 2009, 8 Pages.
Srinivasan, et al., "Orko: Facilitating Multi-modal Interaction for Visual Exploration and Analysis of Networks", in Journal of IEEE Transactions on Visualization and Computer Graphics, vol. 24, Issue 1, Jan. 2018, pp. 511-521.
Su, et al., "Building Natural Language Interfaces to Web APIs", in Proceedings of the ACM on Conference on Information and Knowledge Management, Nov. 6, 2017, pp. 177-186.
Su, et al., "Natural Language Interfaces with Fine-Grained user Interaction: A Case Study on Web APIs", in Proceedings of the 41st International ACM SIGIR Conference on Research and Development in Information Retrieval, Jun. 2018, pp. 855-864.
Sun, et al., "Articulate: A semi-automated Model for Translating Natural Language Queries into Meaningful Visualizations", in Proceedings of the 10th international conference on Smart graphics, Jun. 2010, pp. 184-195.
Wang, et al., "RAT-SQL: Relation-Aware Schema Encoding and Linking for Text-to-SQL Parsers", in Proceedings of the 58th Annual Meeting of the Association for Computational Linguistics, Jul. 5, 2020, pp. 7567-7578.
Grosz, et al., "TEAM: An Experiment in the Design of Transportable Natural-Language Interfaces", in Journal of Artificial Intelligence, Technical Note 356R, vol. 32, Issue 2, May 1, 1987, 93 Pages.
Wang, et al., "Robust Text-to-SQL Generation with Execution-Guided Decoding", in Repository of arXiv:1807.03100v3, Sep. 13, 2018, 8 Pages.
Weizenbaum, Joseph., "ELIZA—A Computer Program for the Study of Natural Language Communication between Man and Machine", in Journal of Communications of the ACM, vol. 9, Issue 1, Jan. 1996, pp. 36-45.
Woods, William A., "Progress in Natural Language Understanding: An Application to Lunar Geology", in Proceedings of the National Computer Conference and Exposition, Jun. 4, 1973, pp. 441-450.
Xu, et al., "SQLNet: Generating Structured Queries From Natural Language Without Reinforcement Learning", in Repository of arXiv:1711.04436, Nov. 13, 2017, 13 Pages.
Yu, et al., "CoSQL: A Conversational Text-to-SQL Challenge Towards Cross Domain Natural Language Interfaces to Databases", in Repository of arXiv:1909.05378v1, Sep. 11, 2019, 18 Pages.
Yu, et al., "FlowSense: A Natural Language Interface for Visual Data Exploration within a Dataflow System", In Proceedings of the IEEE Transactions on Visualization and Computer Graphics, vol. 26, Issue 1, Jan. 2020, op. 1-11.
Yu, et al., "SParC: Cross-Domain Semantic Parsing in Context", In Repository of arXiv:1906.02285v1, Jun. 5, 2019, 13 Pages.
Yu, et al., "SyntaxSQLNet: Syntax Tree Networks for Complex and Cross-DomainText-to-SQL Task", In Repository of arXiv: 1810.05237v1, Oct. 11, 2018, 11 Pages.
Zhang, et al., "Editing-Based SQL Query Generation for Cross-Domain Context-Dependent Questions", In Repository of arXiv: 1909.00786v1, Sep. 2, 2019, 12 Pages.
Zhong, et al., "SEQ2SQL: Generating Structured Queries from Natural Language using Reinforcement Learning", In Journal of Computing Research Repository, Sep. 2017, pp. 1-12.
Grosz, et al., "TEAM: An Experiment in the Design of Transportable Natural-Language Interfaces", In Journal of Artificial Intelligence, vol. 32, Issue 2, May 1, 1987.

\* cited by examiner

NATURAL LANGUAGE QUERY PROCESSING AND DEBUGGING

BACKGROUND

Using natural language input to query a data store and identify relevant data therein makes the data more accessible to users. However, it is difficult for a user to determine whether the query was interpreted correctly such that the data returned from the data store is accurate and complete.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to natural language query processing and debugging. In example, a natural language input, such as a text input or a voice input, is processed to generate a query in a formal data processing language. The formal query may be executed to retrieve data from a data store. In some instances, an indication as to which subparts of the natural language input were used to generate the formal query may be presented to a user. The user may determine to understand, assess, or debug the query, such that associations between natural language input subparts and formal query subparts may be presented to the user. The user may change, add, or remove such associations.

In other examples, sample data may be determined from the data store, where the sample data comprises data that is responsive (e.g., data from a data store that is selected by the formal query), partially responsive (e.g., data from the data store that is selected by a subquery of the formal query), or not responsive to the formal query. A set of steps may be generated and presented to the user, such that the steps provide an indication to the user as to how the formal query is executed. For example, a template may be identified for each step, which provides a description of the step and, in some instances, may be populated with data from the sample data that is processed according to the step. The user may manipulate the sample data, thereby causing the presented steps to be updated accordingly. Once the user has made adjustments and has finished debugging (e.g., inspecting, fixing, or modifying) the query, the revised formal query may be executed to retrieve updated data from the data store.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
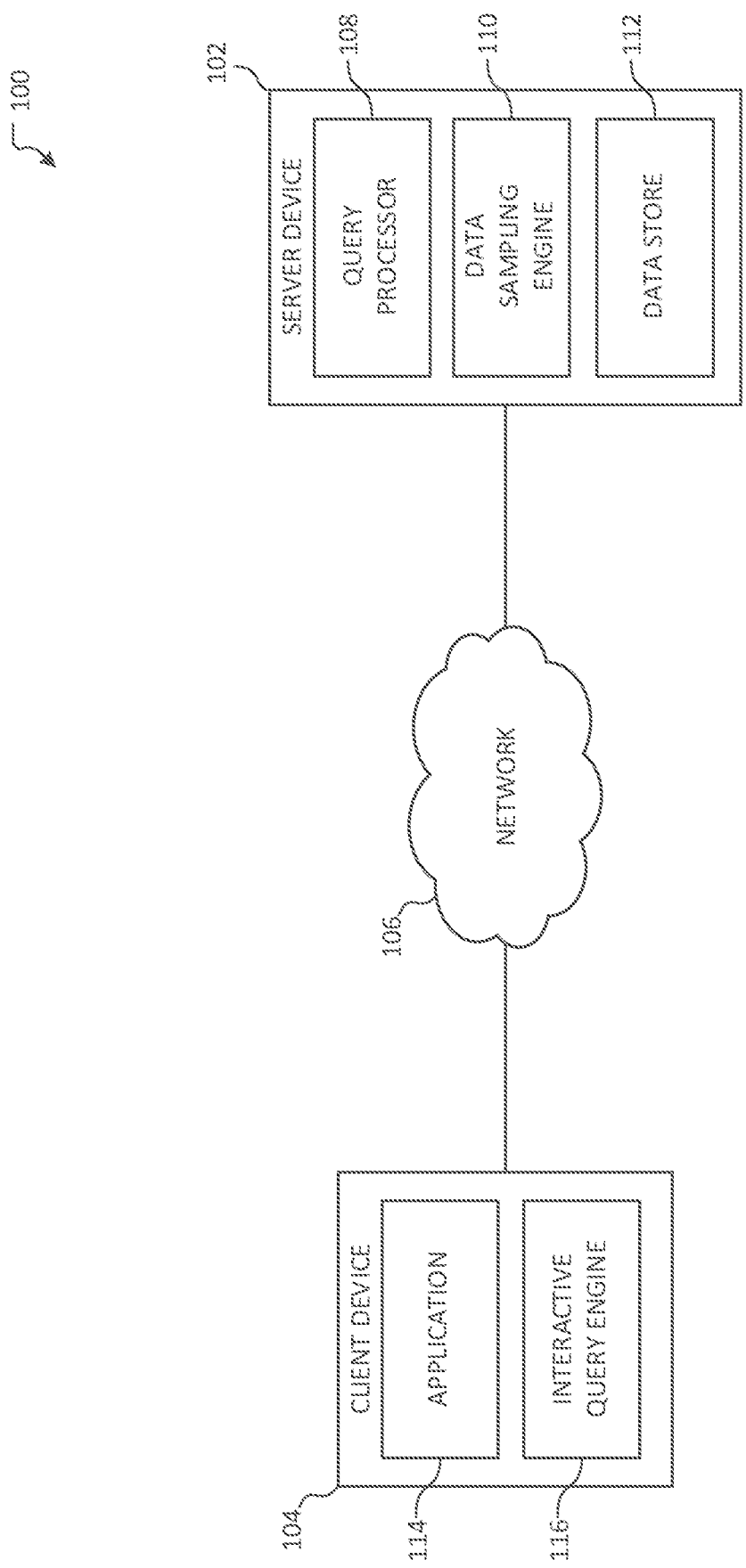
FIG. 1 illustrates an overview of an example system in which aspects of the disclosed natural language query processing and debugging techniques may be practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a natural language interface enables a user to query a data store using natural language rather than a formal query language. For example, natural language input (e.g., text input or voice input) is received from a user and processed to generate a query in a formal data processing language (which may be referred to herein as a "formal query"). The formal query is executed in the data store, thereby identifying relevant data within the data store. The identified data may then be presented to the user in response.

However, it may be difficult for the user to determine whether the natural language input was processed correctly and that the data provided in response is accurate. For example, columns of the data store may be incorrectly mapped to words of the natural language input or a word of the natural language input that should have been mapped to a data store column may have been inadvertently omitted, among other errors. Identifying such errors may be difficult for users that are unfamiliar with the content of the data store and/or with formal querying techniques.

Accordingly, aspects of the present disclosure relate to natural language query processing and debugging. In examples, natural language input is received from a user and processed to generate a formal query. Natural language input subparts that are associated with formal query subparts may be emphasized, thereby providing an indication to the user as to which parts of the natural language input have been identified as being part of a query for data of the data store. The formal query is executed in the data store to generate output data, which is provided to the user as a response to the natural language query. It will be appreciated that the output data need not be the actual data stored in the data store, but may instead be processed and/or otherwise associated with data stored in the data store. For example, output data may comprise an average value or a quantity of values determined from the data store.

In some instances, a user may provide an indication to debug the formal query with which the output data was identified (e.g., the user may actuate a user interface element or provide natural language input indicative of a request to debug the query), such that an interactive user interface is presented to the user. The interactive user interface may present associations between natural language input subparts and formal query subparts, as well as sample data selected from the data store. The user may change associations between a natural language input subpart and a formal query subpart. As used herein, a natural language input subpart may comprise one or more words. A formal query subpart may comprise an operator, table or column name, command, function, and/or other formal query command entities.

As another example, the user may add or remove an association. In some examples, the interactive user interface further comprises a set of example steps and sample data for generating output data, such that the user may understand how the formal query is used to narrow the sample data and ultimately yield output data that is responsive to the query. For example, each step may be associated with a subquery of the formal query. The interactive user interface may change according to user modification of associations between formal query subparts and natural language subparts.

The sample data may be selected from the data store according to a set of rules that yields sample data that is instructive to the user. For example, the sample data may be selected so as to include rows that are both selected by to the query and not selected by to the query, thereby illustrating to the user how the sample data is filtered according to the query. As used herein, data that is not responsive to the formal query may be data that is ultimately not present in the output that results from executing the formal query in the data store. In other examples, the interactive user interface enables the user to modify the sample data, such that the user may change, add, and/or remove data in order to understand or inspect the behavior of the query. The interactive user interface may be updated according to such user modifications, such that the displayed steps associated with generating the output data and the resulting output data may be updated accordingly.

The user may ultimately indicate acceptance of the formal query (e.g., as may have been modified according to aspects described herein), such that the formal query is executed in the data store and used to provide resulting output data accordingly. As a result, the user is able to verify the behavior of the formal query that was generated based on the natural language input. In instances where the generated formal query is incorrect, the user is able to correct the formal query in the context of sample data and execute the corrected formal query in the data store. In some examples, corrections received from the user via the interactive user interface are stored so as to improve formal query generation in the future. For example, the corrected formal query may be stored such that it may be used to provide the correct output data in response to a subsequent natural language query by the user or, as another example, such corrections may be stored as annotated training data, which may be used to improve performance of a machine learning model that is used to generate a formal query from natural language input accordingly.

FIG. 1 illustrates an overview of an example system 100 in which aspects of the disclosed natural language query processing and debugging techniques may be practiced. As illustrated, system 100 comprises server device 102, client device 104, and network 106. In examples, server device 102 and client device 104 communicate using network 106, which may comprise a local area network, a wireless network, or the Internet, or any combination thereof, among other examples.

Server device 102 may be any of a variety of computing devices or, in other examples, server device 102 may be comprised of multiple computing devices. As illustrated, server device 102 comprises query processor 108, data sampling engine 110, and data store 112. Query processor 108 may receive a natural language input (e.g., from client device 104) and generate a formal query accordingly. For example, query processor 108 may apply a machine learning model such as RAT-SQL ("RAT-SQL: Relation-Aware Schema Encoding and Linking for Text-to-SQL Parsers" by Bailin Wang, Richard Shin, Xiaodong Liu, Oleksandr Polozov, and Matthew Richardson. Proceedings of the 58th Annual Meeting of the Association for Computational Linguistics, pgs. 7567-7578) or SQLNet ("SQLNet: Generating Structured Queries From Natural Language Without Reinforcement Learning" by Xiaojun Xu, Chang Liu, and Dawn Song. arXiv:1711.04436), both of which are hereby incorporated by reference in their entirety. Thus, it will be appreciated that any of a variety of techniques may be used to generate a formal query from a natural language input.

Data store 112 may store any of a variety of data. For example, data store 112 may comprise a relational database having any of a variety of tables, rows, and/or datatypes therein. While examples are described herein with respect to relational databases, it will be appreciated that similar techniques may be applied to any of a variety of data stores, including, but not limited to, graph databases and key-value stores. Server device 102 further comprises data sampling engine 110, which may generate sample data from data store 112. For example, sample data may comprise data that is associated with a formal query, as well as data that is not associated with the formal query, such that the data may be processed according to various subqueries of a formal query, thereby providing an illustration of how the query is processed to a user. In examples, data sampling engine 110 generates sample data according to a set of rules. Example rules are provided in Table 1 below.

TABLE 1

Example rules for generating sample data from a data store.

| Subquery | Rule |
| --- | --- |
| SELECT | Identify columns mentioned in the SELECT clause |
| FROM + JOIN | For each record in {table$_1$}, choose each corresponding record in {table$_2$}, where {column$_1$} {operator} {column$_2$} |
| WHERE | Keep those records whose {column} {operator} {value} |
| GROUP BY | Group records with the same {column} together |
| HAVING | Keep those groups where {aggregation} of {records/columns} {operator} {value} |
| SELECT DISTINCT | Choose the {column} Keep unique records |
| ORDER BY | Sort the records by {column} in the {orderType} order |
| LIMIT | Choose the first {N} record(s) |
| INTERSECT | Choose all records that are common to the answers of Step {M} and Step {N} |
| EXCEPT | Choose all records from the answer of Step {M} that are not in the answer of Step {N} |
| UNION | Combine all records from the answer of Step {M} and the answer of Step {N} |

In examples, data sampling engine 110 generates a predetermined number of sampled rows or, as another example, generates sample data having as many rows as needed to satisfy the set of rules. In some instances, rules processed by data sampling engine 110 may be hierarchical or may be prioritized to satisfy as many rules as possible via the predetermined number of sampled rows. In instances where data sampling engine 110 is unable to identify data from data store 112 that satisfies a rule, data sampling engine 110 may generate new data for inclusion in the sample data. For example, new data may be generated programmatically or based on user input, among other examples. As such, the sample data may be generated so as to provide data that is responsive to the formal query, while further including data that is not responsive or partially responsive so as to enable a user to evaluate the behavior of the formal query. It will be appreciated that any of a variety of techniques may be used to sample data from data store 112.

Client device 104 may be any of a variety of computing devices, including, but not limited to, a mobile computing device, a tablet computing device, or a desktop computing device. Client device 104 is illustrated as comprising application 114 and interactive query engine 116. In examples, application 114 receives natural language input from a user of client device 104, such that data associated with the natural language input may be identified from data store 112 according to aspects described herein. For example, application 114 may receive voice input and/or text input. In examples, application 114 facilitates communication with a chatbot or virtual assistant of server device 102.

In examples, application 114 provides received natural language input to query processor 108, which may generate a formal query based on the natural language input as discussed above. Accordingly, query processor 108 may execute the formal query in data store 112 to identify associated data. Query processor 108 may provide at least a part of the identified data in response to application 114. In examples, query processor 108 provides the formal query, at least a part of the schema of data store 112, an attention map, and/or other processing output associated with the generation of the formal query from the natural language input. As a result, application 114 may process the attention map to associate natural language input subparts with formal query subparts, thereby providing an indication to the user as to which parts of the natural language input were used to generate the formal query. Application 114 may present the received data (e.g., that was determined to be responsive to the natural language input) to the user.

In examples, a user may provide an indication to debug the query. As a result, interactive query engine 116 may obtain sample data from data store 112, as may be generated by data sampling engine 110 as described above. Interactive query engine 116 may generate a display of associations between natural language input subparts and formal query subparts. The displayed associations may be generated based at least in part on the received formal query and/or schema that was received from query processor 108. The display may enable a user to change such associations, for example updating a mapping between a natural language input subpart and a column of data store 112. As another example, a user may add or remove associations.

Interactive query engine 116 may generate a display of one or more example steps associated with generating output data based on the sample data, such that the user may understand how the formal query is used to yield output data that is responsive to the query. Thus, it will be appreciated that the example steps used with the sample data need not be the same steps as are actually used to identify data from data store 112. For example, query processor 108 may process the formal query using a query planner when identifying data in data store 112, while the steps presented by interactive query engine 116 may be presented for ease of understanding by the user. Thus, the actions performed by query processor 108 and the example steps may be different but semantically equivalent. Thus, both the actions performed by query processor 108 and the example steps will return the same data when used to process the same source data.

TABLE 2

Example explanation templates.

| Subquery | Template |
| --- | --- |
| FROM | Choose columns from the {table} table |
| FROM + JOIN | For each record in {$table_1$}, choose each corresponding record in {$table_2$}, where {$column_1$} {operator} {$column_2$} |
| WHERE | Keep those records whose {column} {operator} {value} |
| GROUP BY | Group records with the same {column} together |
| HAVING | Keep those groups where {aggregation} of {records/column} {operator} {value} |
| SELECT | Choose the {column} |
| DISTINCT | Keep unique records |
| ORDER BY | Sort the records by {column} in the {orderType} order |
| LIMIT | Choose the first {N} record(s) |
| INTERSECT | Choose all records that are common to the answers of Step {M} and Step {N} |
| EXCEPT | Choose all records from the answer of Step {M} that are not in the answer of Step {N} |
| UNION | Combine all records from the answer of Step {M} and the answer of Step {N} |

Each example step may be associated with a subquery of the formal query. For example, a template may be identified for each step and used to provide a description to the user of the actions performed by the subquery. The template may comprise a textual explanation of the subquery, as well as a graphical representation of the subquery (e.g., using sample data to illustrate the operation of the subquery). For example, one or more rows of the sample data may be dimmed to indicate that they are removed by a subquery or, as another example, adjacent tables may have visual differences of the data contained therein. In examples, the set of templates may convey an order in which steps are to be presented. For example, a first template may illustrate that relevant columns are selected (and, in some instances, joined as necessary). A subsequent template may illustrate that the resulting records may be filtered accordingly.

In examples, a template is populated using the sample data, such that the sample data is processed according to the subquery and presented accordingly. In some instances, the interactive user interface may change according to user modification of associations between formal query subparts and natural language subparts. In other instances, the interactive user interface enables the user to manipulate the sample data, for example to add data, remove data, or change data. As a result, the presented steps may be updated accordingly. Example explanation templates are provided above in Table 2.

While user input processed by interactive query engine 116 may be used to update templates and/or output data identified from the sample data, such user input is separate from data store 112, such that the user may manipulate the sample data without affecting data stored by data store 112.

In some instances, interactive query engine 116 may request new sample data from data sampling engine 110. Further, in other examples, at least some of the sample data may be manually selected by the user or, as another example, may be manufactured by data sampling engine 110 and/or interactive query engine 116, as may be the case in instances where data corresponding to a rule does not exist. In other examples, data may be selected, manufactured, or adapted such that certain characteristics match that of data in data store 112. For example, the sample data may be generated such that it has a variance and/or an average similar to that of data in data store 112.

Once a user has finished debugging the formal query, interactive query engine 116 may receive a user indication to execute the revised query on data store 112 (e.g., rather than the sample data). Accordingly, interactive query engine 116 may provide an indication of the revised query to query processor 108, which may identify data from data store 112. Interactive query engine 116 receives the identified data, which is presented to the user by application 114. In some instances, application 114 presents the data associated with the revised query in conjunction with the data associated with the initial query, such that the user may compare the results. In other instances, the formal query may remain unchanged, such that the formal query need not be re-executed by query processor 108. In such instances, the interactive user interface may no longer be displayed.

While example functionality is described with respect to server device 102 and client device 104, it will be appreciated that, in other examples, such functionality may be implemented according to any of a variety of other paradigms. For example, data sampling engine 110 may be implemented by client device 104, such that data sampling engine 110 generates one or more queries with which to retrieve sample data from data store 112 via query processor 108. As another example, a data sampling engine local to client device 104 may receive or cache at least a subpart of the data stored by data store 112, which may be processed locally according to aspects described herein. In other instances, aspects of the present disclosure may be applied to a data store that is local to client device 104 or, as another example, server device 102 may implement an interactive query engine that, for example, populates templates with sample data and provides populated templates to client device 104 for display by application 114.

Figure 2:
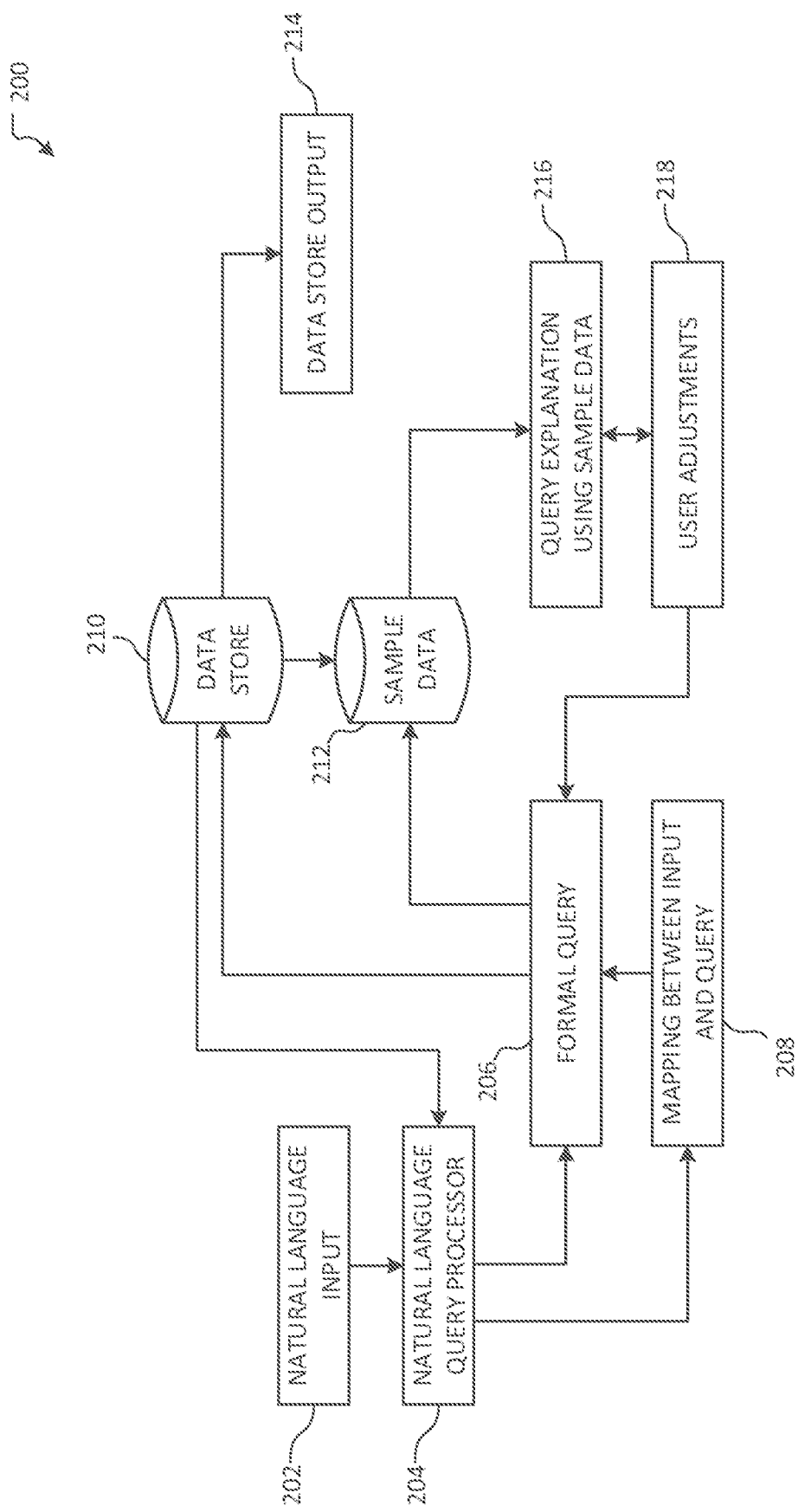
FIG. 2 illustrates an overview of an example block diagram for natural language query processing and debugging.

FIG. 2 illustrates an overview of an example block diagram 200 for natural language query processing and debugging. As illustrated, natural language input 202 is provided to natural language query processor 204 to generate formal query 206 accordingly. For example, natural language input 202 may be received from an application of a client device, such as application 114 of client device 104 discussed above with respect to FIG. 1. In examples, natural language query processor 204 further generates mapping 208 between subparts of natural language input 202 and subparts of formal query 206, which may be associated as described above. Accordingly, formal query 206 is used to identify data from data store 210. For example, formal query 206 may be executed in data store 210 by a query processor, such as query processor 108 discussed above with respect to FIG. 1. As a result, data store output 214 is generated, which may be provided for display to a user (e.g., by an application such as application 114 of client device 104 in FIG. 1).

Block diagram 200 is further illustrated as comprising sample data 212, which is generated from data store 210. For example, a data sampling engine such as data sampling engine 110 in FIG. 1 may be used to generate sample data 212. Accordingly, formal query 206 may be used to identify data from sample data 212, such that query explanation 216 is generated using sample data 212. For example, query explanation 216 may be generated by an interactive query engine, such as interactive query engine 116 in FIG. 1.

In examples, user adjustments 218 are received, which may be used to update query explanation 216 as described above. In some instances, formal query 206 may be updated, as may be the case in instances where a user adds, removes, and/or changes associations between natural language input 202 and formal query 206. Ultimately, if a user is satisfied with formal query 206 (e.g., as a result of query explanation 216 and/or user adjustments 218), formal query 206 may be executed in data store 210, thereby yielding data store output 214. An arrow is illustrated from data store 210 to natural language query processor 204 to indicate that natural language query processor 204 may be trained at least in part on data from data store 210 or, as another example, natural language query processor 204 may be trained based on user adjustments 218.

Figure 3:
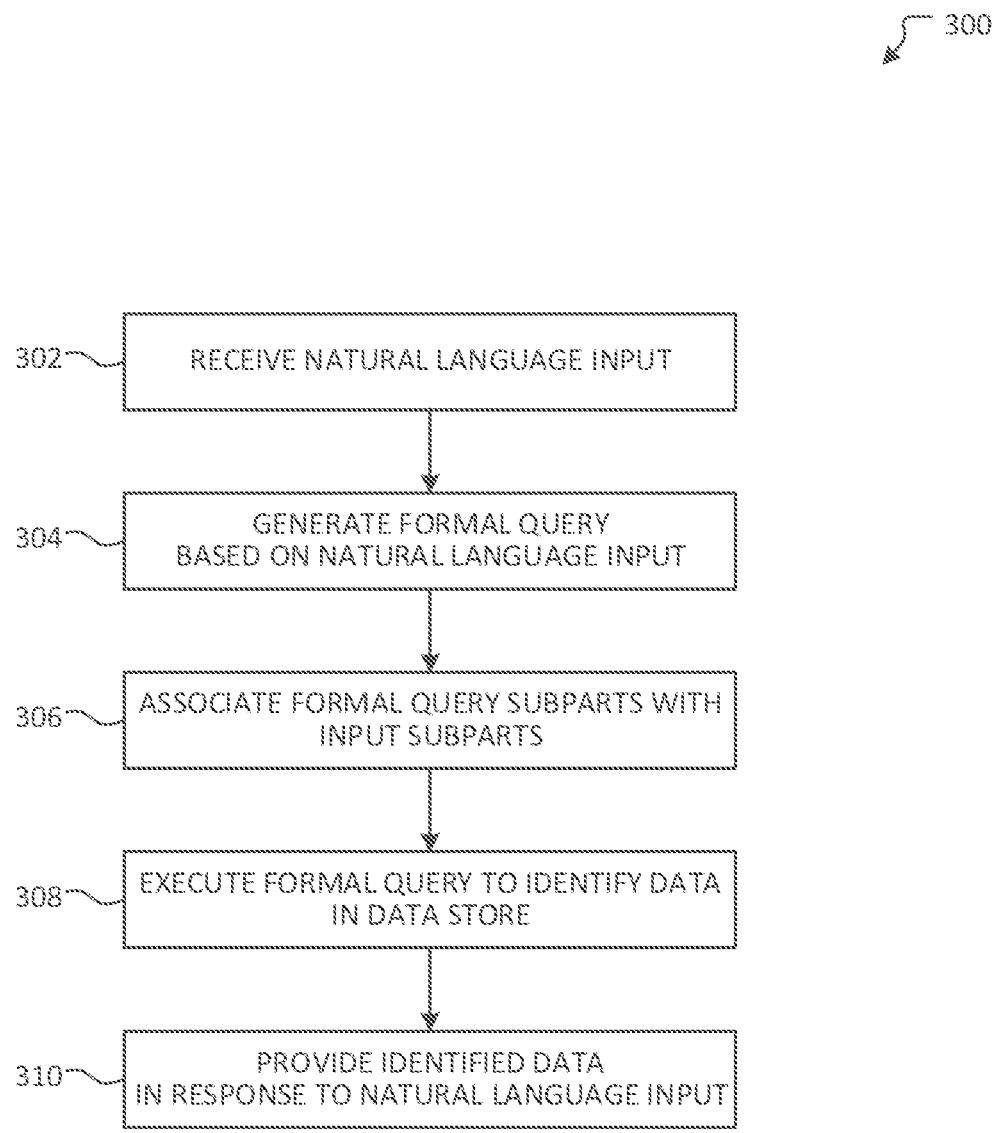
FIG. 3 illustrates an overview of an example method for processing query input to identify data in a data store and indicate query input subparts in association with formal query subparts according to aspects described herein.

FIG. 3 illustrates an overview of an example method 300 for processing query input to identify data in a data store and indicate query input subparts in association with formal query subparts according to aspects described herein. In examples, aspects of method 300 are performed by a computing device, such as server device 102 discussed above with respect to FIG. 1.

Method 300 begins at operation 302, where natural language input is received. For example, text input or voice input may be received. The natural language input may be received from an application of a client device, such as application 114 on client device 104 in FIG. 1. At operation 304, a formal query is generated based on the received natural language input. For example, the natural language input may be processed by a query processor, such as query processor 108 in FIG. 1. In instances where the received natural language input comprises voice input, operation 304 may comprise generating a textual representation of the voice input.

Flow progresses to operation 306, where formal query subparts are associated with natural language input subparts. For example, operation 304 may generate an attention map that may be processed to determine which subparts of the generated formal query are associated with which subparts of the natural language input. In some instances, operation 306 may be omitted. For instance, an attention map and/or other output generated at operation 304 may be provided to a client device, such that it may be processed by the client device according to aspects described herein.

At operation 308, the formal query is executed to identify data in a data store. For example, the formal query may be executed by a query processor (e.g., query processor 108 in FIG. 1) to identify data in a data store similar to data store 112. Accordingly, at operation 310, the identified data is provided in response to the natural language input that was received at operation 302. Thus, the natural language input is processed to generate a formal query, which is used to identify data from the data store that is responsive to the natural language input. In examples, operation 310 comprises providing the formal query and/or the associations that were generated at operations 304 and 306, respectively. As a result, subparts of the natural language input may be emphasized or otherwise annotated to indicate such subparts were used to generate the formal query. In other instances, operation 310 comprises providing an attention map and/or other model output generated at operation 304, such that associations may be generated by the recipient device accordingly. Method 300 terminates at operation 310.

Figure 4:
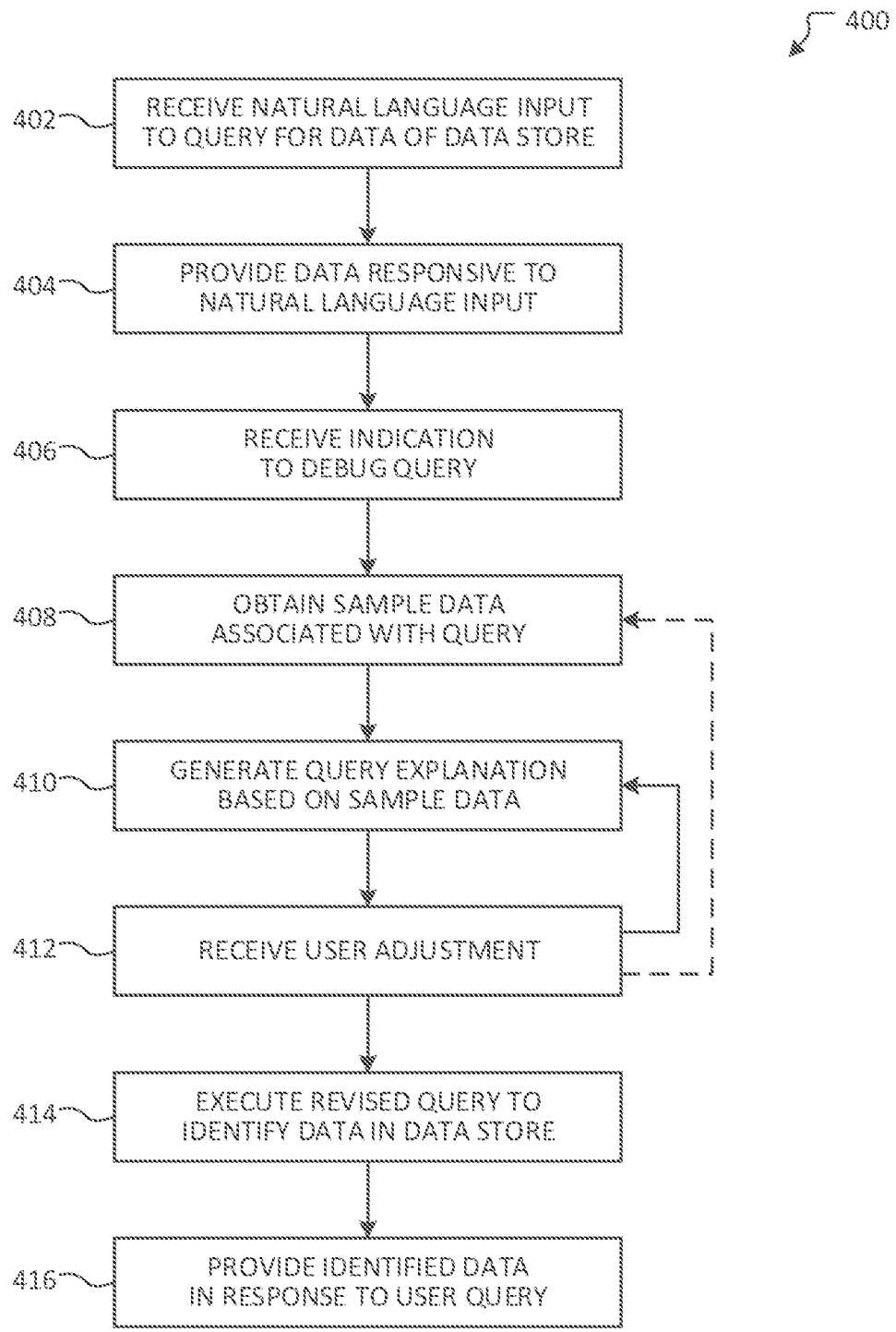
FIG. 4 illustrates an overview of an example method for providing query debugging and adapting a query according to user input according to aspects described herein.

FIG. 4 illustrates an overview of an example method 400 for providing query debugging and adapting a query according to user input according to aspects described herein. In examples, aspects of method 400 are performed by a computing device, such as client device 104 discussed above with respect to FIG. 1.

Method 400 begins at operation 402, where natural language input is received to query for data of a data store. For example, the natural language input may be received by an application of a client device, such as application 114 of client device 104 in FIG. 1. As discussed above, the natural language input may comprise any of a variety of inputs, including, but not limited to, text input and/or voice input.

At operation 404, data responsive to the natural language input is provided. For example, operation 404 may comprise providing the natural language input to a query processor (e.g., query processor 108 of server device 102 in FIG. 1), which may process the natural language input and provide associated data in response. In some instances, the query processor further provides an indication as to a formal query that was generated based on the natural language input, as well as an attention map or other model output associated with generating the formal query from the natural language input. Accordingly, operation 404 may further comprise providing an indication of one or more associations between natural language input subparts and formal query subparts. For example, text associated with formal query subparts may be highlighted and/or bolded. It will be appreciated that any of a variety of styling, annotations, and/or other emphasis techniques may be used.

Flow progresses to operation 406, where an indication to debug the query is received. For example, a user interface element may have been presented at operation 404 in association with the data that is responsive to the natural language input, such that the received indication is a user actuation of the user interface element.

At operation 408, sample data associated with the query is obtained. For example, a request for sample data may be provided to a server device (e.g., server device 102 in FIG. 1), such that sample data is received in response (e.g., as may be generated by a data sampling engine, such as data sampling engine 110). In other examples, at least a part of a data store may be stored locally, such that it may be processed to generate sample data according to aspects described herein. Thus, sample data may be generated based processing the formal query according to a set of rules (e.g., as discussed above with respect to Table 1). In some instances, operation 408 comprises generating manufactured entries, as may be the case when data corresponding to a rule is not available. In other instances, operation 408 comprises receiving user input, for example receiving one or more selections of data from the data store or receiving new data to be included in the sample data, among other examples.

At operation 410, a query explanation is generated based on the sample data. For example, the explanation may comprise a set of steps associated with subqueries of the formal query. As described above, a template may be identified for each step and used to provide a description of the actions performed by the subquery. Example templates are described above with respect to Table 2. In some instances, operation 410 further comprises populating the template with at least a part of the sample data that was obtained at operation 408. As noted above, the example steps need not be the same steps as are performed by a query processor when executing the formal query. For instance, the example steps may comprise a different order or, as another example, may illustrate the data being processed in a manner that is different from that of a query processor. Rows that would be eliminated by the formal query (e.g., as the result of a "where" subquery) may be greyed out or using strikethrough or, as another example, a row that is the product of a "group by" subquery may be expandable to enable a user to see the constituent rows.

Flow progresses to operation 412, where one or more user adjustments are received. For example, a user may update the formal query (e.g., as was used to identify data responsive to the natural language input at operation 404). As an example, the user may add, remove, and/or change associations between the natural language input and the formal query. In other instances, the user may add, remove, or change the sample data, thereby enabling the user to evaluate how the formal query processes the sample data. Thus, aspects described herein enable the user to evaluate the formal query and adjust the formal query as appropriate using sample data from the data store. The data store need not be repeatedly queried, nor do changes to the sample data affect the data in the data store itself.

An arrow is illustrated from operation 412 to operation 410 to indicate that, as the user changes the formal query and/or sample data, the query explanation may be updated accordingly. In other examples, a user input may be received to obtain new sample data. Thus, method 400 is illustrated with a dashed arrow from operation 412 to operation 408 to indicate that, in such examples, flow may instead progress from operation 412 to operation 408. The sample data may be generated according to an adjusted formal query (e.g., as may be the result of operation 412). Accordingly, flow loops between operations 408, 410, and/or 412 to enable the user to debug the query and explore the behavior of the formal query using sample data as described above. Such aspects may be performed by an interactive query engine, such as interactive query engine 116 in FIG. 1.

Ultimately, if the user is satisfied with the formal query (e.g., as a result of one or more iterations though operations 410 and 412), flow progresses to operation 414, where the revised query is executed to identify data in the data store. Such aspects may be similar to operation 404, where the revised formal query is provided to a query processor, such that data is received in response.

Accordingly, at operation 416, the identified data is provided. In some instances, the data associated with the revised query (e.g., from operation 414) is provided in conjunction with the data associated with the initial query (e.g., from operation 402), such that the user may compare the results. For example, the data may be displayed side-by-side or may be displayed in a way that shows changes between the sets of data. Flow terminates at operation 416.

FIGS. 5A-5D illustrate overviews of example user interfaces 500, 530, 560, and 580 according to aspects described herein. Certain aspects of FIGS. 5A-5D are similar and are therefore not necessarily re-described below in detail.

Figure 5A:
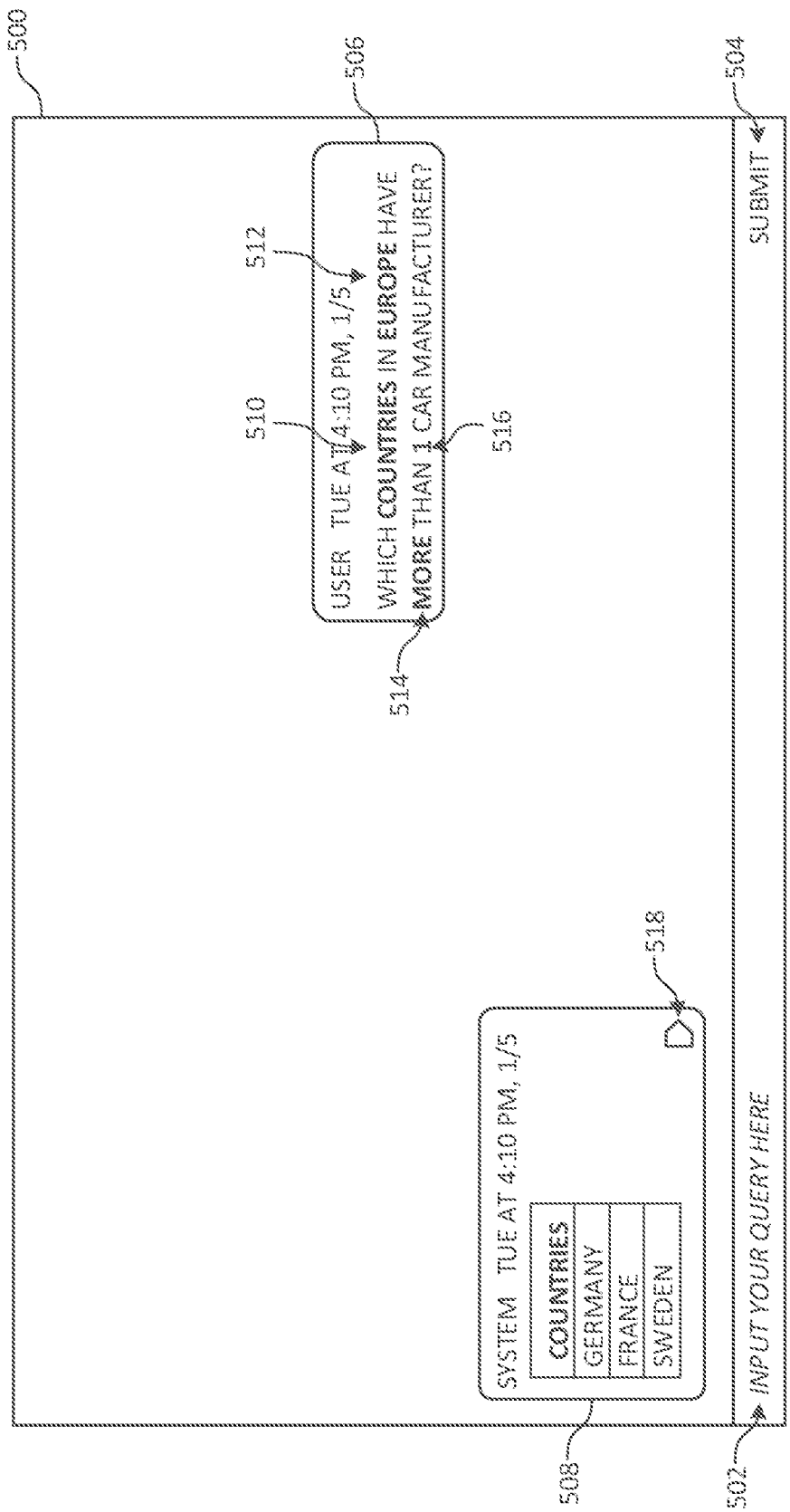
FIGS. 5A-5D illustrate overviews of example user interfaces according to aspects described herein.

With reference to FIG. 5A, user interface 500 illustrates an example user interface 500 via which a natural language input may be received in input field 502. Accordingly, a user may type a query in input field 502, which may be submitted by actuating submit button 504. In other examples, a keypress may be received via a keyboard or any of a variety of other input mechanisms may be used. It will be appreciated that while the instant example is described in the context of text input, any of a variety of other natural language input may be used in other instances.

Message box 506 is illustrated as comprising text input that was received from a user via input field 502 ("which countries in Europe have more than 1 car manufacturer?"). As illustrated, certain subparts 510, 512, 514, and 516 of the input are emphasized. Such emphasis may have been generated as a result of a query processor (e.g., query processor 108 in FIG. 1) generating an attention map for the natural language input, which may have been processed to identify associations between formal query subparts and the emphasized subparts 510, 512, 514, and 516.

User interface 500 is further illustrated as comprising message box 508, which comprises output data responsive to the natural language input. For example, a formal query generated based on the natural language input in message box 506 may have been used to identify data from a data store, such as data store 112 in FIG. 1. Message box 508 further comprises user interface element 518 that, when actuated, presents an interactive user interface for query debugging (e.g., as may be generated by an interactive query engine, such as interactive query engine 116 in FIG. 1).

Figure 5B:
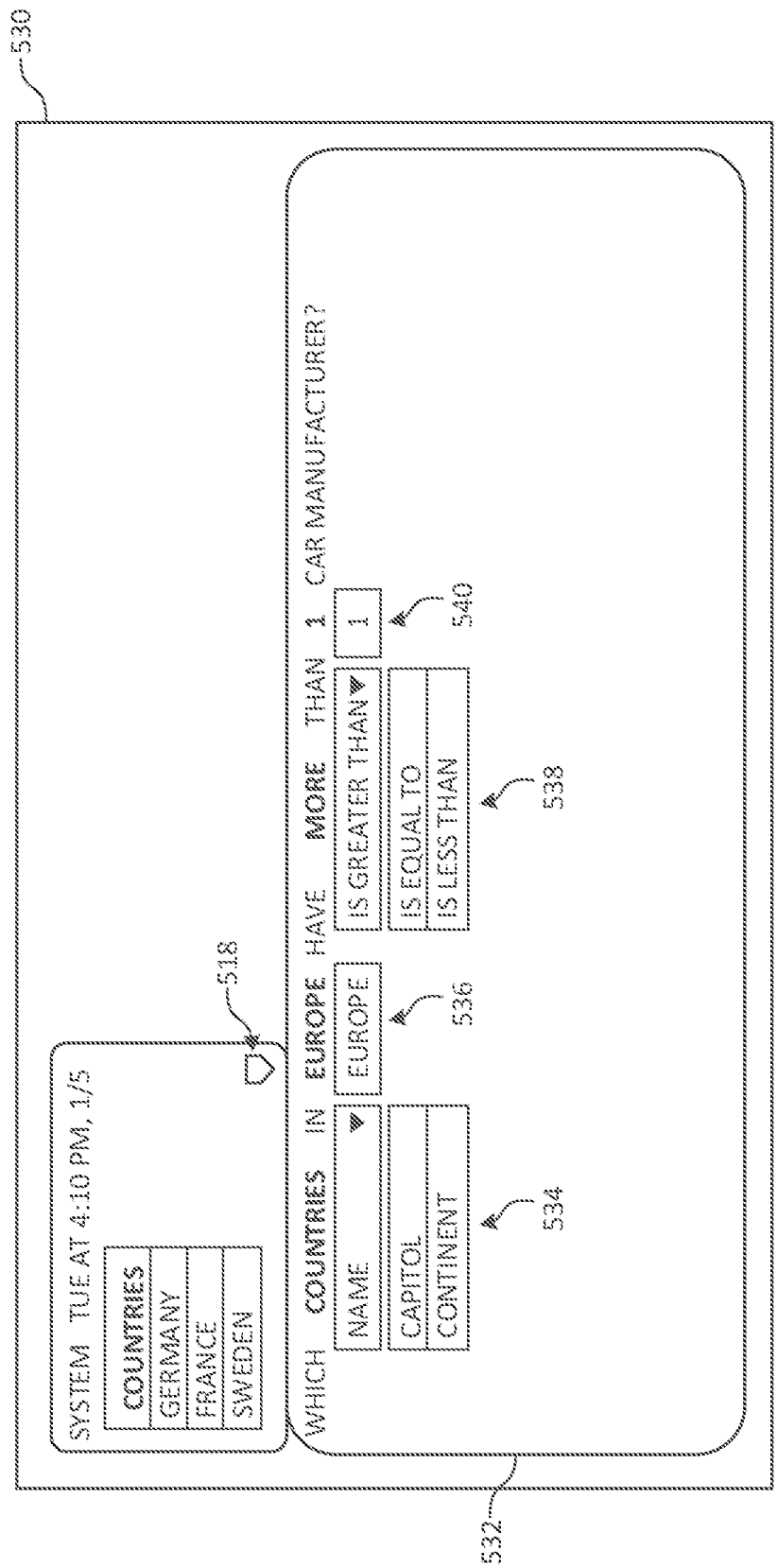

FIG. 5B illustrates an example of such an interactive user interface 530. As illustrated, user interface 532 comprises message box 532 in which a user may view, change, add, and/or remove associations between the natural language input (e.g., as was displayed in message box 506) and aspects of a generated formal query. For example, a user may select a different mapping using drop down menus 534 (e.g., to change a column association) and 538 (e.g., to change an operation mapping) or may enter a different value in input fields 536 and 540. In other examples, a user may actuate one or more terms in the displayed natural language input, such that the user may be presented with an option to associate the input subpart with a formal query subpart (e.g., adding a new column or operator, among other examples).

Figure 5C:
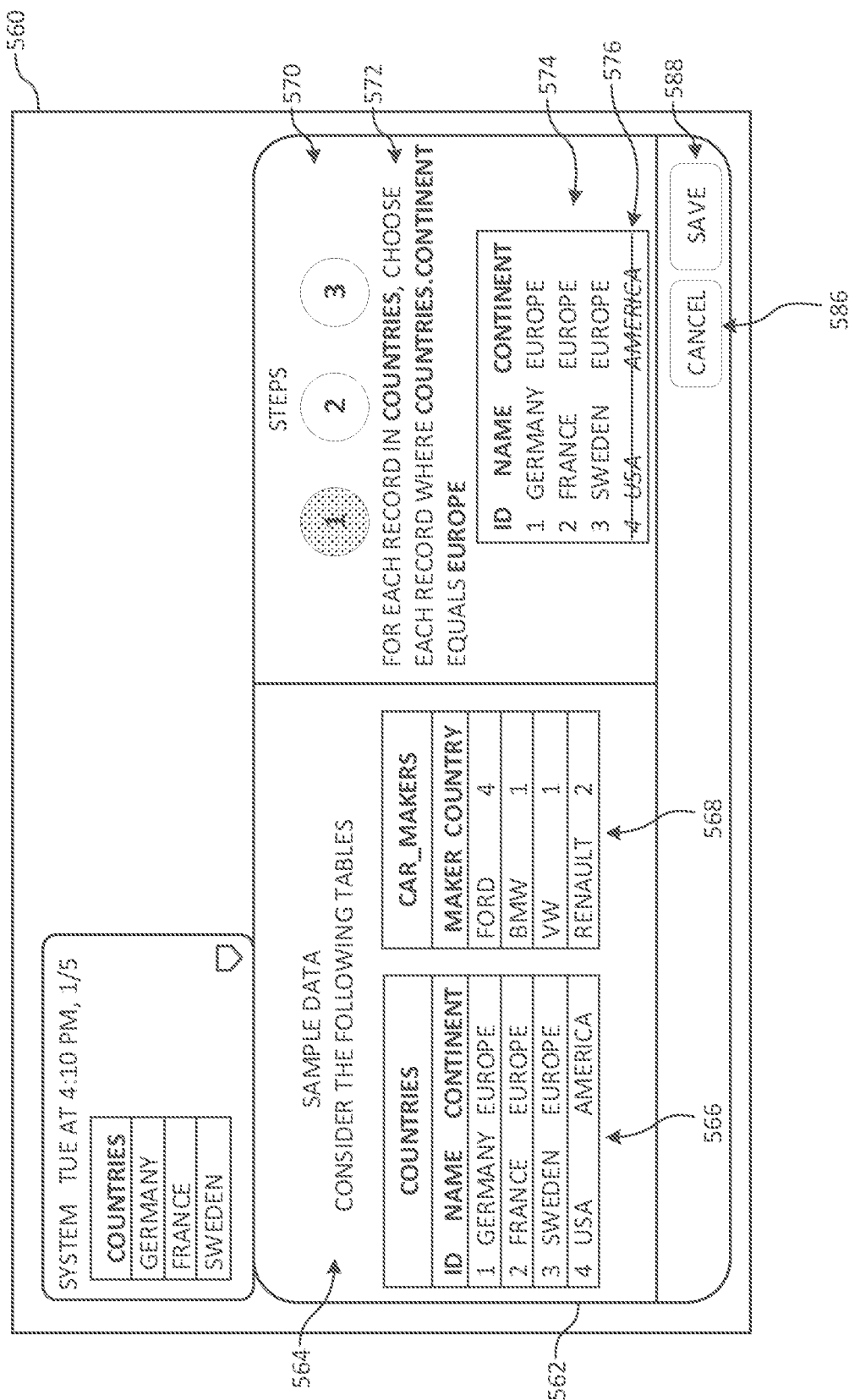

FIG. 5C illustrates additional aspects of an interactive user interface 560, in which sample data 564 and steps 570 are presented to the user. In examples, aspects of message box 562 are displayed beneath or to the right of those displayed in message box 532 of FIG. 5B, such that the user may scroll or swipe vertically or sideways, respectively, within message box 562 to view additional query debugging information. Sample data 564 comprises tables 566 and 568, which, as discussed above, may have been sampled from a data store according to a set of rules, thereby identifying data associated with the query (e.g., Germany, France, and Sweden are all located in Europe) as well as data that is not associated with the query (e.g., USA is not in Europe).

Steps 570 may have been generated according to a set of templates, such that each of the three screens is associated with a template of the set of templates. As illustrated, steps 570 depicts the first step, where descriptive text 572 is presented in conjunction with populated template table 574. According to aspects described herein, populated template table 574 illustrates a result of performing the step based on the sample data (e.g., table 566), where row 576 is illustrated using strikethrough to indicate that it would be omitted as a result of performing the depicted step.

Figure 5D:
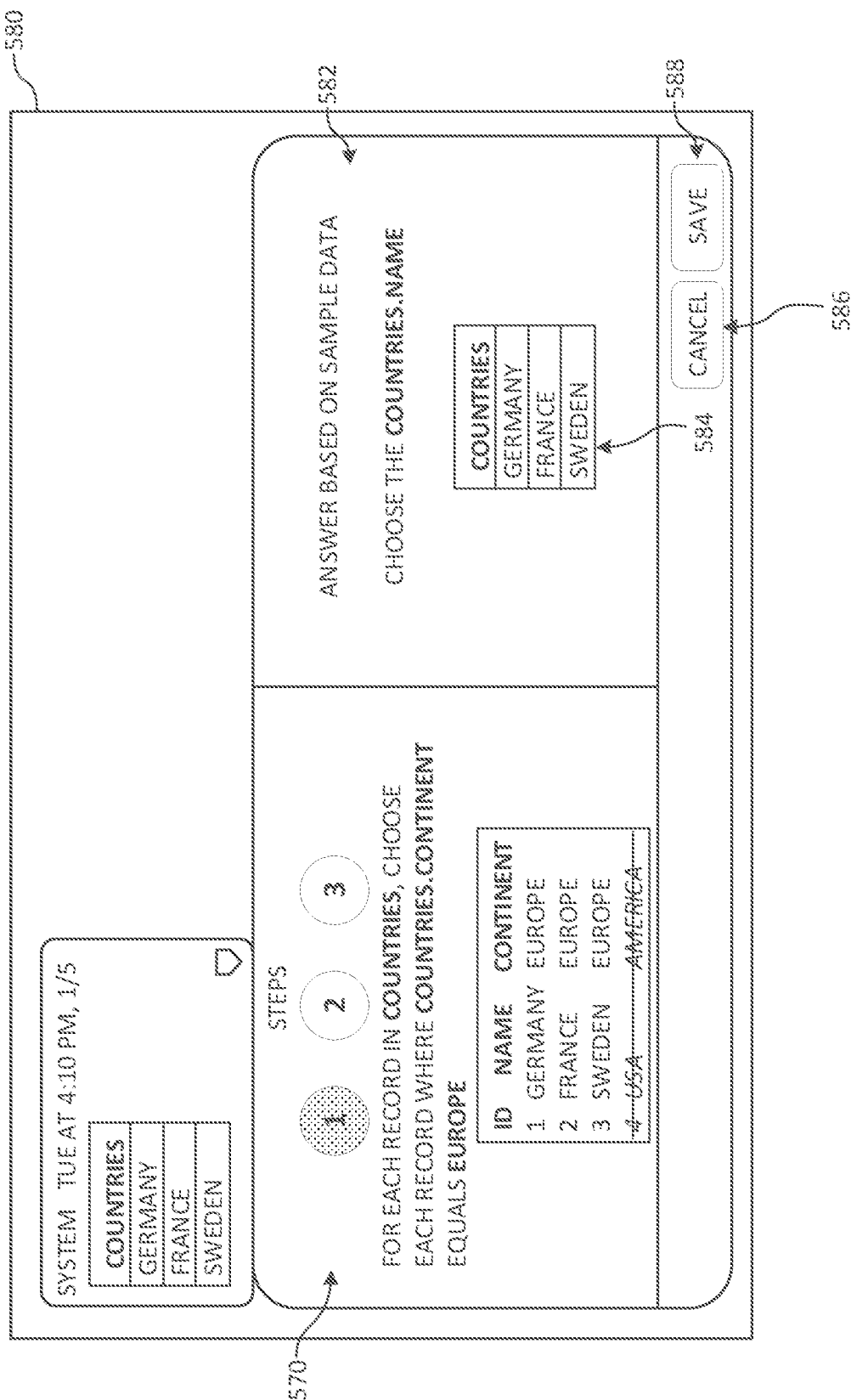

FIG. 5D illustrates additional aspects of an interactive user interface 580. As illustrated, steps 570 has shifted to the left (e.g., as a result of a user scrolling or swiping), such that answer 582 is displayed. Answer 582 comprises output data 584 based on the sample data. A user may modify the sample data (e.g., by adding rows, removing rows, and/or changing rows of tables 566 and/or 568). As noted above with respect to FIG. 5B, the user may similarly adjust the formal query. As a result of modifying the sample data, aspects of user interfaces 530, 560, and 580 (e.g., sample data 564, steps 570, and/or output data 584) may be updated accordingly.

FIGS. 5C and 5D further depict the user interface as comprising cancel button 586 and save button 588. In examples, if a user decides to discard any of the changes discussed above, the user may actuate cancel button 586 such that the debugging user interface is hidden (e.g., returning the user interface to one similar to user interface 500 in FIG. 5A). However, if the user instead decides to retain any changes, the user may instead actuate save button 588, thereby causing the adjusted formal query to be executed based on data in the data store (rather than the sample data that yielded output data 584), thereby yielding updated output data, which may be displayed in conjunction with the output data in message box 508 such that the user may view any changes associated therewith.

It will be appreciated that the user interface and associated user experience aspects discussed above with respect to FIGS. 5A-5D are provided as examples and, in other examples, other paradigms may be used. For example, a tabbed user interface may be used to present sample data 564, steps 570, and output data 584.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
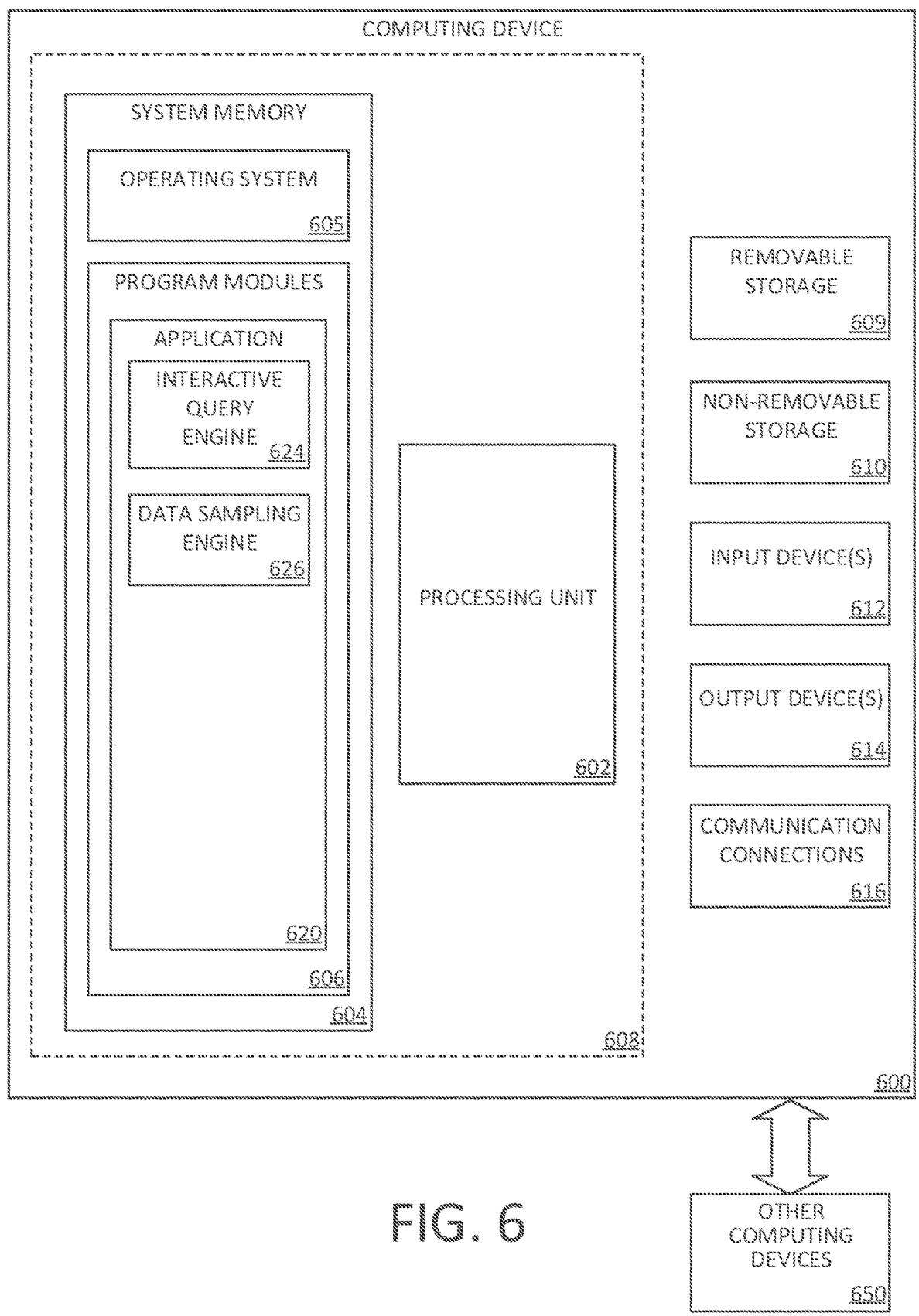
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including server device 102 and client device 104 in FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store interactive query engine 624 and data sampling engine 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
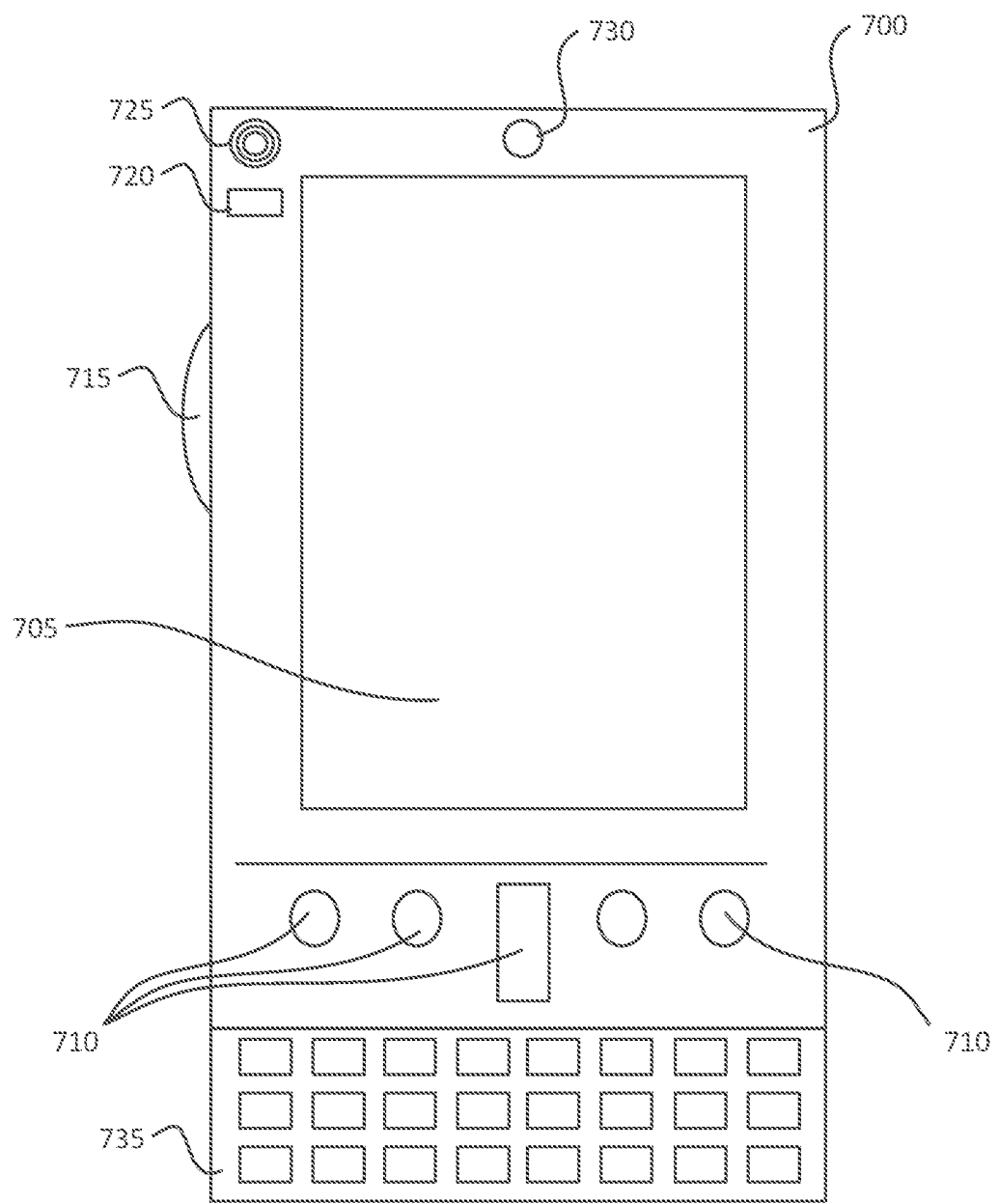
FIGS. 7A and 7B are simplified block diagrams of a mobile computing device with which aspects of the present disclosure may be practiced.
Figure 7B:
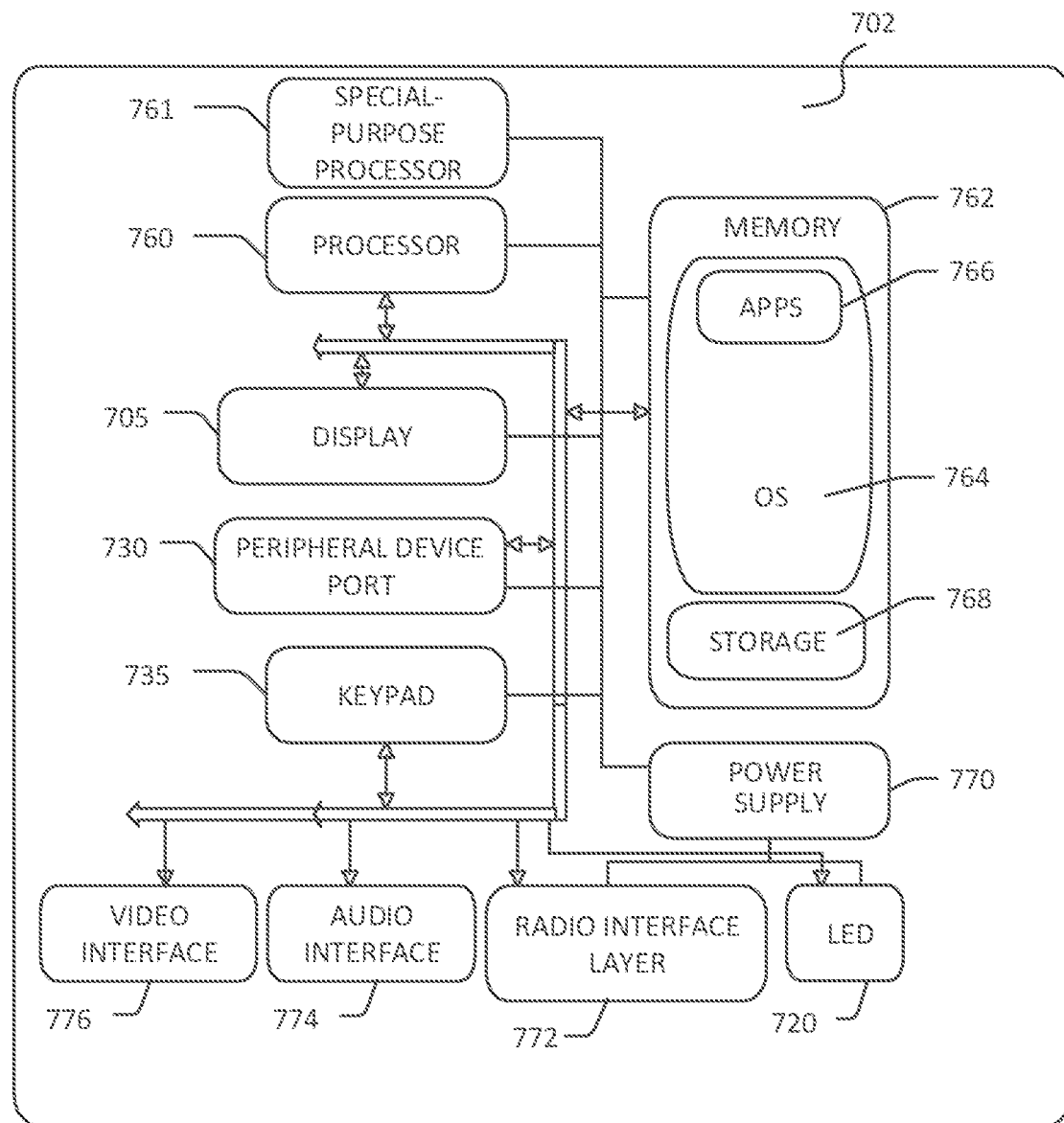

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network Similarly, such data/information may be readily transferred between computing devices for storage and use according to well-known data/information transfer and storage means, including electronic mail and collaborative data/information sharing systems.

Figure 8:
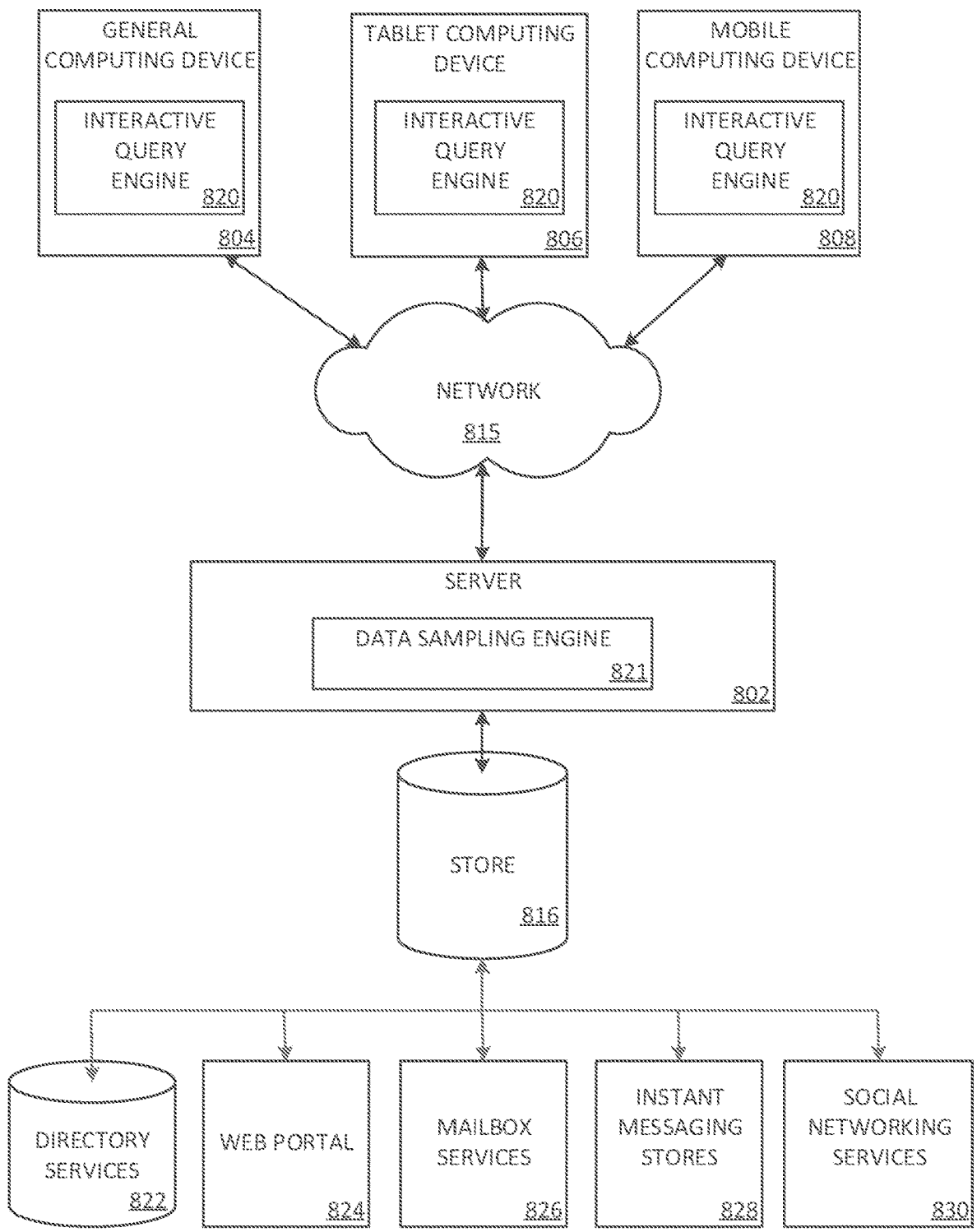
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

An interactive query engine 820 may be employed by a client that communicates with server device 802, and/or data sampling engine 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
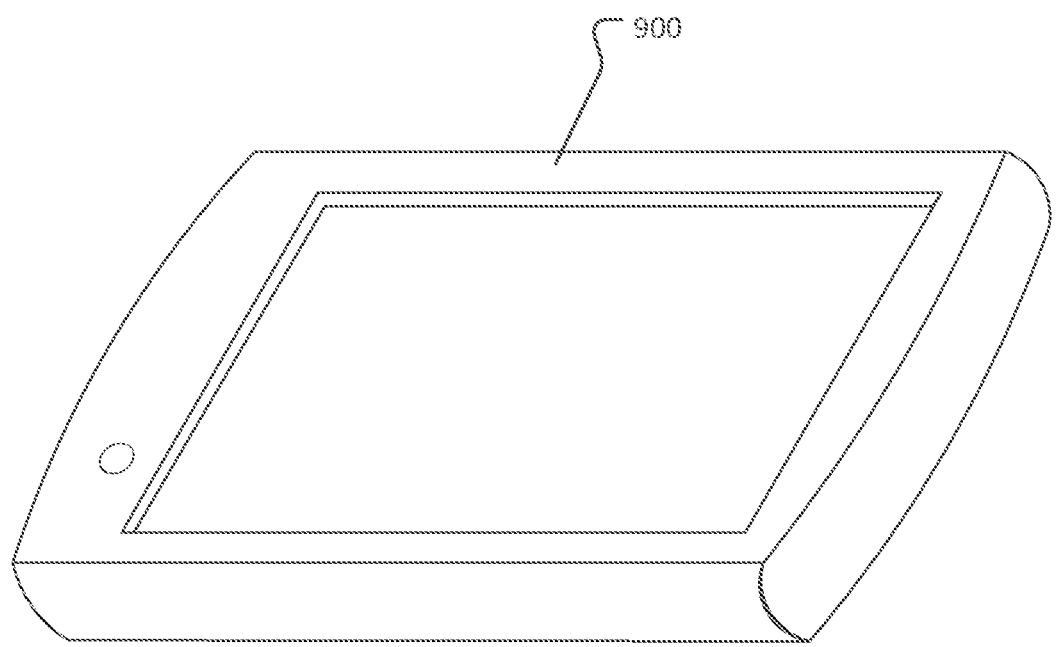
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a system comprising: at least one processor; and memory storing instructions that, when executed by the at least one processor, causes the system to perform a set of operations. The set of operations comprises: receiving, from a user, a natural language user input associated with a query for data from a data store; obtaining data from the data store responsive to the natural language user input; processing the natural language user input to identify an association between a subpart of the natural language user input and a subpart of a formal query for the data in the data store; providing an indication of the identified association to the user; receiving user input to debug the formal query, thereby generating an adjusted formal query; obtaining updated data from the data store responsive to the adjusted formal query; and presenting the updated data to the user. In an example, the set of operations further comprises: in response to the user input to debug the formal query: obtaining sample data from the data store based on the formal query; and presenting a set of steps associated with the formal query, wherein each step of the set of steps is generated according to a template using the sample data. In another example, the sample data is generated based on the formal query according to a set of rules and comprises data that is responsive to the formal query and data that is not responsive to the formal query. In a further example, the set of operations further comprises: receiving user input to modify the sample data; and in response to the received user input to modify the sample data, updating the set of steps. In yet another example, receiving user input to debug the formal query comprises receiving user input to add, remove, or change an association between a subpart of the natural language user input and a subpart of the formal query, thereby generating the adjusted formal query. In a further still example, processing the natural language user input to identify the association between the subpart of the natural language user input and the formal query comprises: processing an attention map generated by a machine learning model, wherein the machine learning model was used to generate the formal query based on the natural language user input. In an example, the natural language user input comprises text input; and providing an indication of the identified association to the user comprises emphasizing at least a part of a display of the text input.

In another aspect, the technology relates to a method for debugging a formal query based on natural language user input. The method comprises: receiving, from a user, a natural language user input associated with a query for data from a data store; obtaining data from the data store responsive to the natural language user input; receiving user input to debug the formal query; and in response to the user input to debug the formal query: obtaining, based on the formal query, sample data from the data store, wherein the sample data comprises data that is not responsive to the formal query; generating a set of steps associated with the formal query, wherein each step of the set of steps is generated according to a template using the sample data; and presenting at least one step of the generated set of steps to the user. In an example, the sample data is generated according to a set of rules based on the formal query. In another example, the method further comprises: receiving user input to modify the sample data; and in response to the received user input to modify the sample data, updating at least one step of the set of steps. In a further example, the method further comprises presenting updated data from the sample data that is responsive or non-responsive to the formal query. In yet another example, the method further comprises: receiving user input to add, remove, or change an association between a subpart of the natural language user input and a subpart of the formal query, thereby generating an adjusted formal query; obtaining updated data from the data store responsive to the adjusted formal query; and presenting the updated data to the user. In a further still example, the method further comprises storing the adjusted formal query as training data for a machine learning model that processes natural language input to generate formal queries.

In a further aspect, the technology relates to a method for debugging a formal query based on natural language user input. The method comprises: receiving, from a user, a natural language user input associated with a query for data from a data store; obtaining data from the data store responsive to the natural language user input; processing the natural language user input to identify an association between a subpart of the natural language user input and a subpart of a formal query for the data in the data store; providing an indication of the identified association to the user; receiving user input to debug the formal query, thereby generating an adjusted formal query; obtaining updated data from the data store responsive to the adjusted formal query; and presenting the updated data to the user. In an example, the method further comprises: in response to the user input to debug the formal query: obtaining sample data from the data store based on the formal query; and presenting a set of steps associated with the formal query, wherein each step of the set of steps is generated according to a template using the sample data. In another example, the sample data is generated based on the formal query according to a set of rules and comprises data that is responsive to the formal query and data that is not responsive to the formal query. In a further example, the method further comprises: receiving user input to modify the sample data; and in response to the received user input to modify the sample data, updating the set of steps. In yet another example, example, receiving user input to debug the formal query comprises receiving user input to add, remove, or change an association between a subpart of the natural language user input and a subpart of the formal query, thereby generating the adjusted formal query. In a further still example, processing the natural language user input to identify the association between the subpart of the natural language user input and the formal query comprises: processing an attention map generated by a machine learning model, wherein the machine learning model was used to generate the formal query based on the natural language user input. In another example, the natural language user input comprises text input; and providing an indication of the identified association to the user comprises emphasizing at least a part of a display of the text input.

The description and illustration of one or more aspects provided in this application are not intended to limit or restrict the scope of the disclosure as claimed in any way. The aspects, examples, and details provided in this application are considered sufficient to convey possession and enable others to make and use the claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
receiving, from a user, a natural language user input associated with a query for data from a data store;
obtaining data from the data store responsive to a formal query that corresponds to the natural language user input;
processing the natural language user input to identify an association between a subpart of the natural language user input and a subpart of the formal query for the data in the data store;
providing, for display to the user, a graphical indication of the identified association between the subpart of the natural language user input and the subpart of the formal query, thereby indicating to the user that the subpart of the formal query corresponds to the subpart of the natural language user input;
receiving user input to debug the formal query, thereby generating an adjusted formal query;
obtaining updated data from the data store responsive to the adjusted formal query; and
presenting the updated data to the user.

2. The system of claim 1, wherein the set of operations further comprises: in response to the user input to debug the formal query:
obtaining sample data from the data store based on the formal query; and
presenting a set of steps associated with the formal query, wherein each step of the set of steps is generated according to a template using the sample data.

3. The system of claim 2, wherein the sample data is generated based on the formal query according to a set of rules and comprises data that is responsive to the formal query and data that is not responsive to the formal query.

4. The system of claim 2, wherein the set of operations further comprises:
receiving user input to modify the sample data; and
in response to the received user input to modify the sample data, updating the set of steps.

5. The system of claim 1, wherein receiving user input to debug the formal query comprises receiving user input to add, remove, or change an association between a subpart of the natural language user input and a subpart of the formal query, thereby generating the adjusted formal query.

6. The system of claim 1, wherein processing the natural language user input to identify the association between the subpart of the natural language user input and the formal query comprises:
processing an attention map generated by a machine learning model, wherein the machine learning model was used to generate the formal query based on the natural language user input.

7. The system of claim 1, wherein:
the natural language user input comprises text input; and
providing an indication of the identified association to the user comprises emphasizing at least a part of a display of the text input.

8. A method for debugging a formal query based on natural language user input, the method comprising:
receiving, from a user, a natural language user input associated with a query for data from a data store;
obtaining data from the data store responsive to the natural language user input;
receiving user input to debug the formal query; and
in response to the user input to debug the formal query:
obtaining, based on the formal query, sample data from the data store, wherein the sample data comprises data that is not responsive to the formal query and the sample data is generated according to a set of rules based on the formal query;
generating a set of steps associated with the formal query, wherein each step of the set of steps is generated according to a template using the sample data; and
presenting at least one step of the generated set of steps to the user.

9. The method of claim 8, further comprising:
receiving user input to modify the sample data; and
in response to the received user input to modify the sample data, updating at least one step of the set of steps.

10. The method of claim 9, further comprising presenting updated data from the sample data that is responsive or non-responsive to the formal query.

11. The method of claim 8, further comprising:
receiving user input to add, remove, or change an association between a subpart of the natural language user input and a subpart of the formal query, thereby generating an adjusted formal query;
obtaining updated data from the data store responsive to the adjusted formal query; and
presenting the updated data to the user.

12. The method of claim 11, further comprising storing the adjusted formal query as training data for a machine learning model that processes natural language input to generate formal queries.

13. The method of claim 8, further comprising:
receiving user input to modify the sample data; and
in response to the received user input to modify the sample data, updating the set of steps.

14. A method for debugging a formal query based on natural language user input, the method comprising:
receiving, from a user, a natural language user input associated with a query for data from a data store;
obtaining data from the data store responsive to a formal query that corresponds to the natural language user input;
processing the natural language user input to identify an association between a subpart of the natural language user input and a subpart of the formal query for the data in the data store;
providing, for display to the user, a graphical indication of the identified association between the subpart of the natural language user input and the subpart of the formal query, thereby indicating to the user that the subpart of the formal query corresponds to the subpart of the natural language user input;
receiving user input to debug the formal query, thereby generating an adjusted formal query;
obtaining updated data from the data store responsive to the adjusted formal query; and
presenting the updated data to the user.

15. The method of claim 14, comprising: in response to the user input to debug the formal query:

obtaining sample data from the data store based on the formal query; and presenting a set of steps associated with the formal query, wherein each step of the set of steps is generated according to a template using the sample data.

16. The method of claim 15, wherein the sample data is generated based on the formal query according to a set of rules and comprises data that is responsive to the formal query and data that is not responsive to the formal query.

17. The method of claim 15, further comprising:
receiving user input to modify the sample data; and
in response to the received user input to modify the sample data, updating the set of steps.

18. The method of claim 14, wherein receiving user input to debug the formal query comprises receiving user input to add, remove, or change an association between a subpart of the natural language user input and a subpart of the formal query, thereby generating the adjusted formal query.

19. The method of claim 14, wherein processing the natural language user input to identify the association between the subpart of the natural language user input and the formal query comprises:
processing an attention map generated by a machine learning model, wherein the machine learning model was used to generate the formal query based on the natural language user input.

20. The method of claim 14, wherein:
the natural language user input comprises text input; and
providing an indication of the identified association to the user comprises emphasizing at least a part of a display of the text input.

* * * * *